United States Patent

[11] 3,624,719

[72] Inventor Romeu Romi
Sao Paulo, Brazil
[21] Appl. No. 84,793
[22] Filed Oct. 28, 1970
[45] Patented Nov. 30, 1971
[73] Assignee Industrias Romi S.A.
Sao Paulo, Brazil
[32] Priority Nov. 16, 1966
[33] Brazil
[31] 184,575
Original application Nov. 1, 1967, Ser. No. 679,698, now Patent No. 3,548,693.
Divided and this application Oct. 28, 1970, Ser. No. 84,793

[54] METHOD FOR PRESETTING A LATHE TOOL
8 Claims, 16 Drawing Figs.
[52] U.S. Cl. ................................................ 82/1 C, 29/407, 33/185

[51] Int. Cl. ...................................................... B23b 1/00
[50] Field of Search ........................................ 82/1 C, 24; 29/407; 33/185

[56] References Cited
UNITED STATES PATENTS
3,292,267 12/1966 Wilterdink et al. ............ 33/185
2,105,962 1/1938 Bickel ......................... 82/24

*Primary Examiner*—Leonidas Vlachos
*Attorney*—Michael S. Striker

ABSTRACT: A cross tool slide with a master bar is set in a zero position in the main axis of a lathe whereupon indicating counters for the distance of displacement of the slide are set to zero. A tool is substituted for the master bar and also set to a zero position by a gauge on the slide so that the movements of the slide and tool for machining a workpiece are indicated by the indicating counters.

PATENTED NOV 30 1971

INVENTOR
ROMEU ROMI

ATTORNEY

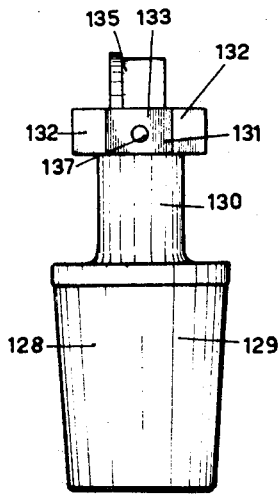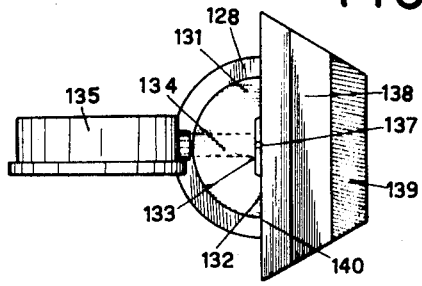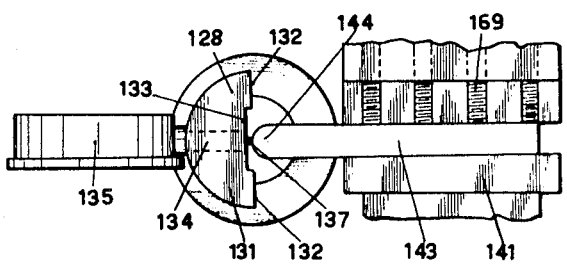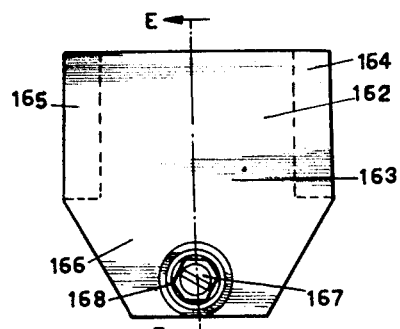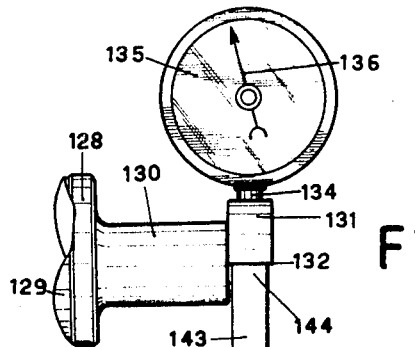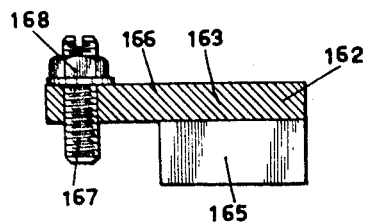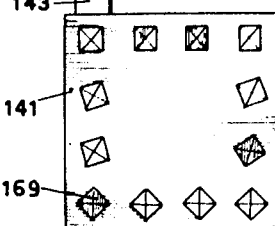

METHOD FOR PRESETTING A LATHE TOOL

This application is a division of my application Ser. No. 679,698 filed Nov. 1, 1967, and now U. S. Pat. No. 3,548,693.

SUMMARY OF THE INVENTION

This invention relates to a method for presetting lathe toolholders, and more particularly to a zero reference positioning means for lathe toolholders which are combined with direct reading diameter indicators.

According to one method of the invention, the lathe toolholder is positioned by the steps of determining the geometric axis of the lathe main spindle by a geometric axis determining device; setting by means of a stop in the main axis a first gauge attached to said geometric axis determining device, the pointer thereof being set at zero for subsequent settings; attaching to the toolholder a master bar; advancing a toolpost and said master bar so that one end thereof touches a sensor of the first gauge already set; setting counter means indicating displacements of the slide carrying the toolpost to zero indication; mounting a tool zero setting device on the upper face of the cross-slide, a second gauge on which being set as the sensing member thereof touches said master bar end; substituting a tool for the master bar in the toolpost and setting such tool at the same overhang already determined for the master bar; applying to a platform in the tool zero-setting device a tool height fixing means and fixing the tool height fixing means for subsequent settings of the tool; withdrawing the cross-slide and attached toolholder, setting up the workpiece; and advancing the cross-slide and the tool on the workpiece until said workpiece has a predetermined diameter as observed from the reading at the indicators.

Axis determination means are provided to determine in a lathe the main spindle's geometric axis, both in the vertical and in the horizontal planes, said means to be used whenever a recheck of the position of the geometric axis is desired.

Again there is provided a means to determine the height at which the cutting edge of the tool must be adjusted which means includes a locking element to hold said means in a set position wherein it serves as a reference for subsequent resetting of the tool height.

For a given setting of the tool the overhang of the tool, i.e., the extension which projects from the toolpost, measured between the toolpost and the cutting edge is permanent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 9 is a front elevation of a device for locating the geometric axis of a lathe's main spindle;

FIG. 10 shows a reference device for the zero setting of a dial provided in the device of FIG. 9;

FIG. 11 shows the geometric axis determination device as set by a master bar used to fix the overhang of the tool;

FIG. 12 is a plan view of the assembly shown in FIG. 11 as viewed from the left, as shown in the drawings;

FIG. 13 is a plan view of the tool height fixing device;

FIG. 14 is a view taken on the line E—E in FIG. 13;

DESCRIPTION OF THE PREFERRED EMBODIMENTS

Figure 1:
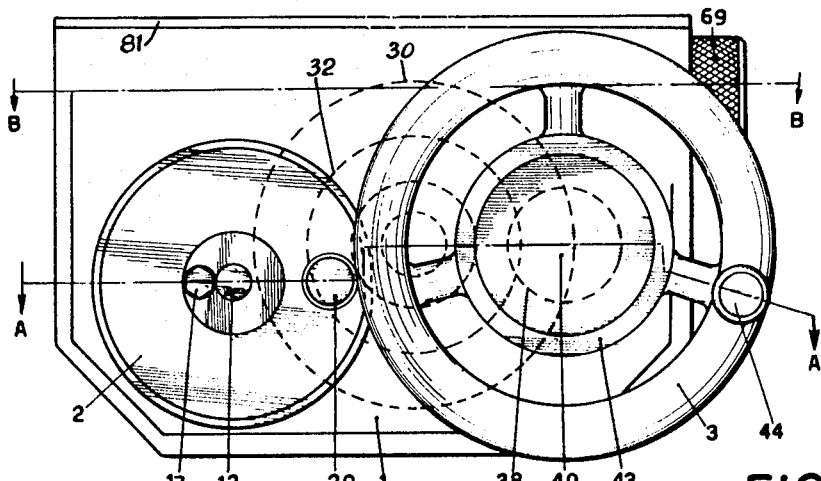
FIG. 1 is a front elevation of the apparatus embodying the invention.
Figure 2:
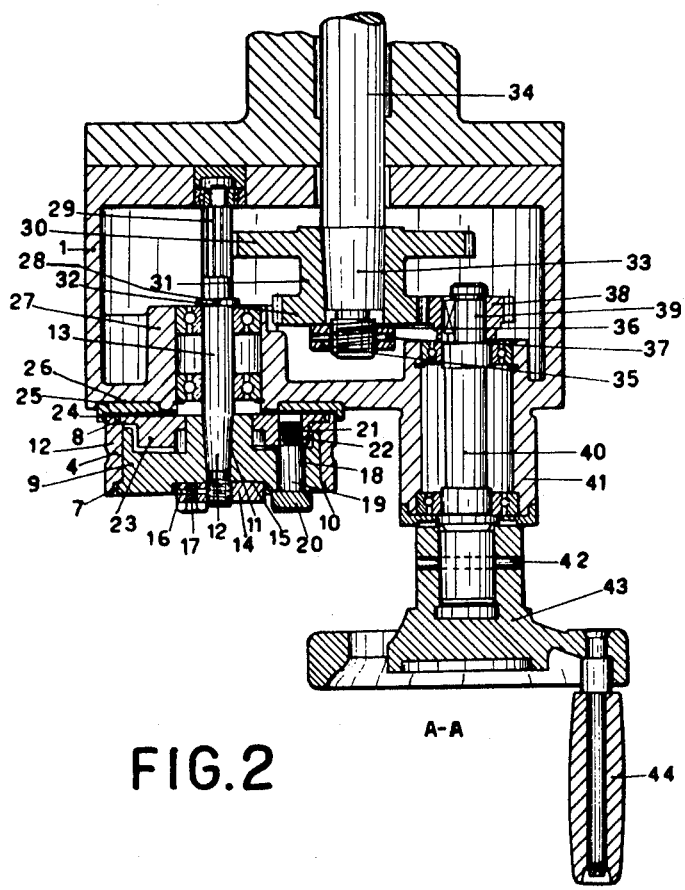
FIG. 2 is a sectional view taken on the line A—A of FIG. 1.

Referring to the drawings a housing 1, FIGS. 1, 2, has a front wall from which projects a fractional graduation drum 2, as well as a flywheel 3, the first one used to govern the idle feeding and the second to control rapid feeding of the cutting tool.

The housing is firmly secured to the front of the cross-slide-rest in a lathe which embodies this invention.

The fractional graduation drum 2 comprises an outer ring 4, on the rear portion of the periphery of which are engraved the fractional graduations 5 (FIG. 3) the use of which will be explained in detail hereinafter. On the front portions of said outer ring 4 are carved knurles 6 to guarantee secure gripping of the idle feed control. In the inner face of said outer ring 4 shoulders 7, 8 are provided by which it is secured to a central annular support 9, which is formed with an annular rim 10, tightened against said shoulder 7. The central annular support 9 is centrally drilled with a conical bore 11 to which is closely adapted the taper end 12 of slow feed control shaft 13, which is threaded at its outer end and has a locknut 14 screwed thereon fitting closely in a round recess 15 milled in the middle portion of said central annular support 9, the locknut 14 being provided with a split 16. A screw 17 is screwed in the threads cut in a bore transversely drilled in the legs formed by said split 15, which serves the purpose of locking said nut 14 as well as the central annular support 9 relative to the idle feed control shaft 13.

In a bore 18 laterally drilled in said support 9 is fitted a bolt 19, the outer end of which is provided with a knurled head 20, and the inner end with threads 21 which screw in threads cut in a perforation 22, bored in a lockring 23.

The assembly of the outer ring 4, the central annular support 9 and the lockring 23 may rotate guided by a projecting rim 24 provided in a support disk 25 fitted into a round recess 26 provided in the front wall of housing 1.

A set of ball bearings mounted in a cylindrical member 27, formed in the front wall of housing 1, will support the smooth rotary movement of idle feed control shaft 13, which in the middle portion is provided with a circular ring 28 in contact with inner ball bearing in order that said idle feed control shaft 13 be prevented from any axial shifting.

Figure 7:
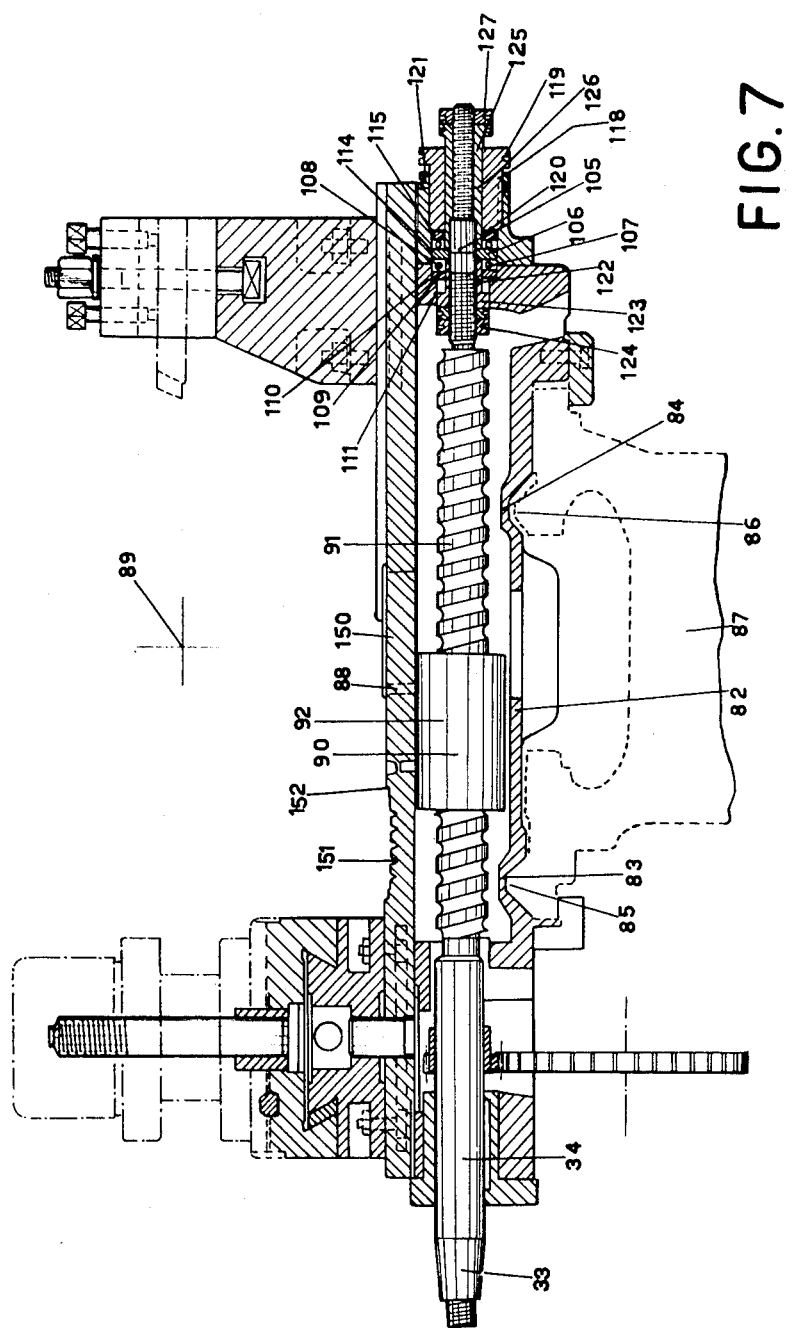
FIG. 7 is a sectional view taken along the crossfeed screw of the lathe.

The inner end of the slow feed control shaft 13 is provided with indentations 29 which engage the teeth of a spur gear 30 mounted on a hub 31 also integrally formed with a spur gear 32 and in the conical inner portion of which is closely fitted the taper end 33 of a crossfeed screw 34, see FIGS. 2 and 7. The hub 31 is locked against axial displacement relative to the crossfeed screw 34 by means of a locknut 35 which can screw on threads 36 cut in the outer end of the crossfeed screw 34 and which is secured by a pin 37 fitting into aligned bores in the locknut 35 and in the outer end of the crossfeed screw 34.

The second spur gear 32 mounted on the outer end of the hub 31 permanently engages a spur gear 38 keyed in the end 39 of a rapid feed control shaft 40, which rotates in a set of ball bearings mounted in a cylindrical member 41, provided in the front wall of housing 1. By means of a pin 42 the rapid feed control shaft 40 is secured firmly to the hub 43 of the flywheel 3 which is provided with a handle 44 through which the flywheel 3 is turned.

Figure 3:
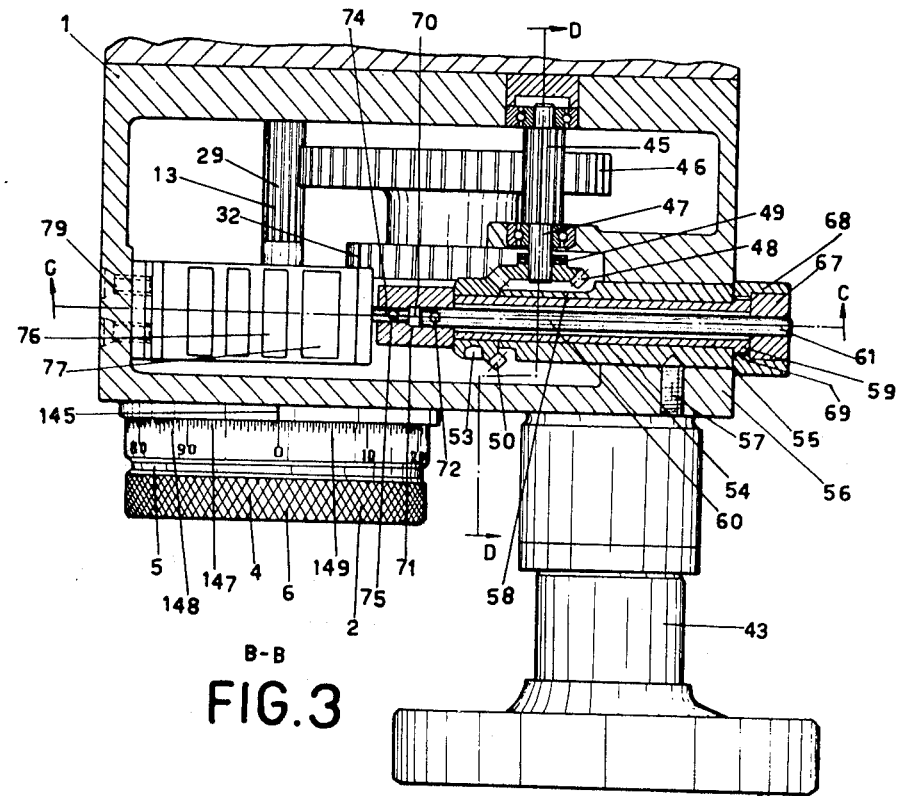
FIG. 3 is a sectional view taken through the line B—B of FIG. 1.
Figure 5:
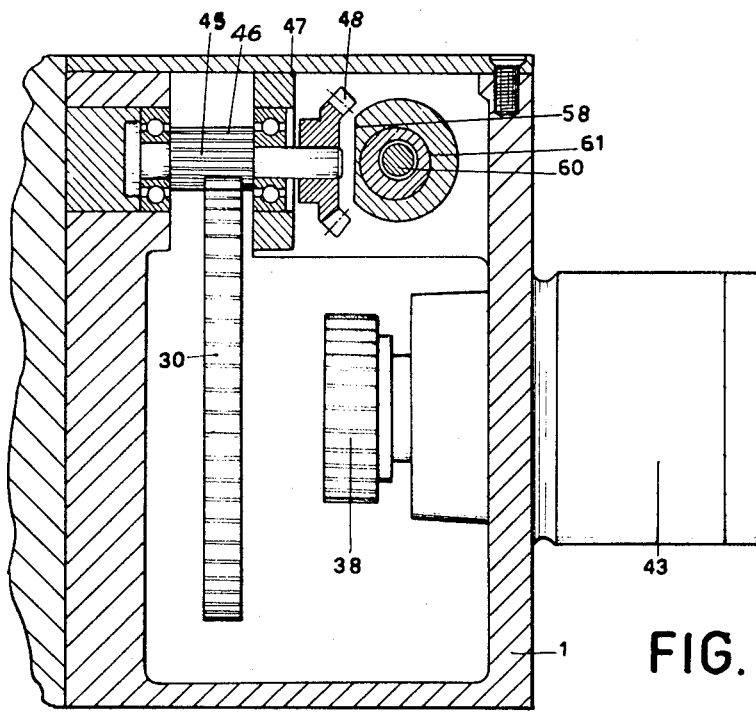
FIG. 5 is a sectional view across the line D—D of FIG. 3.

The spur gear 30 engages teeth 45 provided in an intermediate shaft 46 rotating in ball bearings, see FIGS. 3 and 5.

Figure 4:
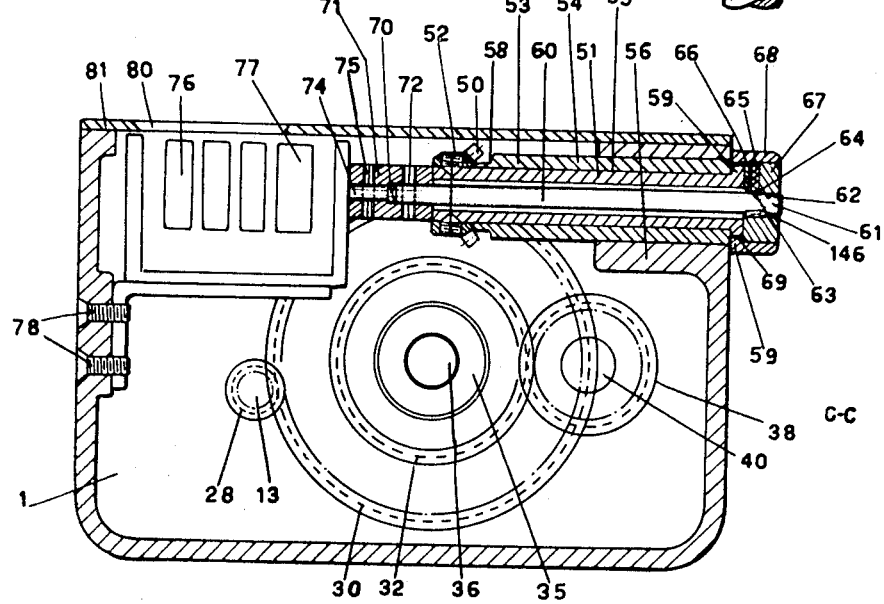
FIG. 4 is a sectional view taken through the line C—C of FIG. 3.

The shaft 46 has at one end 47 a bevel gear 48 firmly secured by a pin 49 and engaging a second bevel gear 50 which is anchored to an outer transversely placed shaft 51, (FIG. 4) by means of setscrews 52 locked by a set ring 53. The outer shaft 51 is supported by a bushing 54, which is firmly fitted in a bore 55 disposed in a member 56, and locked against axial displacement by means of a screw 57, and by the chamfered inner end 58 abutting the front face of hub of the bevel gear 50.

The shaft 51 has a flange 59 abutting the lateral wall of housing 1. The outer shaft 51 receives a concentric actuating shaft 60 which is provided in the outer end 61 with indentations 62, 63 which may be selectively entered by a ball 64 resiliently engaged by a spring 65 arranged in a cavity 66 radially drilled in a disc 67. The disc 67 is firmly secured to a knurled knob 68, which is formed with an inside flange 69, the inner periphery of which is provided with serrations arranged to engage selectively serrations provided in the periphery of the flange 59 of outer shaft 51. At the inner end of the shaft 60 lies a bore 70 drilled in connecting sleeve 71 to which it is secured by means of a pin 72. In the other end of the bore 70, an end 73 of a shaft 74 is inlaid and firmly secured by means of a pin 75.

The above-mentioned shaft 74 is a part of a digital and ordinal indicating counter 76 which is provided with a dummy wheel 77, the tenth rotation of which will change a character in the first order wheel of the digital indicating counter 76. The digital indicating counter 76 is supported by a platform secured to the wall of the housing 1 by means of screws 78. The readings of the digital indicating counter 76 may be observed through a magnifying lens fitted to an aperture 80 provided in the cover 81 of the housing 1.

The crossfeed screw 34 crosses the length of the slide 82 of the lathe. In the middle portion (FIG. 7), the slide 82 is provided with slots 83, 84 arranged at the lower surface thereof, where it is supported slidably by prismatic guide rails 85, 86, provided at the upper surface of the machine bed 87. The turning movements of crossfeed screw 34, by means mounted in the apron of the lathe, cause the cross-slide 88, when the wheel 3 is rotated, to travel rapidly in a precise feed movement as directed by the fractional graduation drum 2.

To execute the crossfeed movements, cross-slide 88 will travel to and from relative to the geometric axis of the lathe guided by means provided in the slide 82. The geometric axis is indicated in FIG. 7 by the numeral 89 for the purpose of a clearer understanding of this explanation. The crossfeed movements are derived from a cross-slide lead nut 90 (FIG. 6 and 7) which travels along the crossfeed screw guided in a channel cut in the slide 82, and is secured to cross-slide 88.

Figure 6:
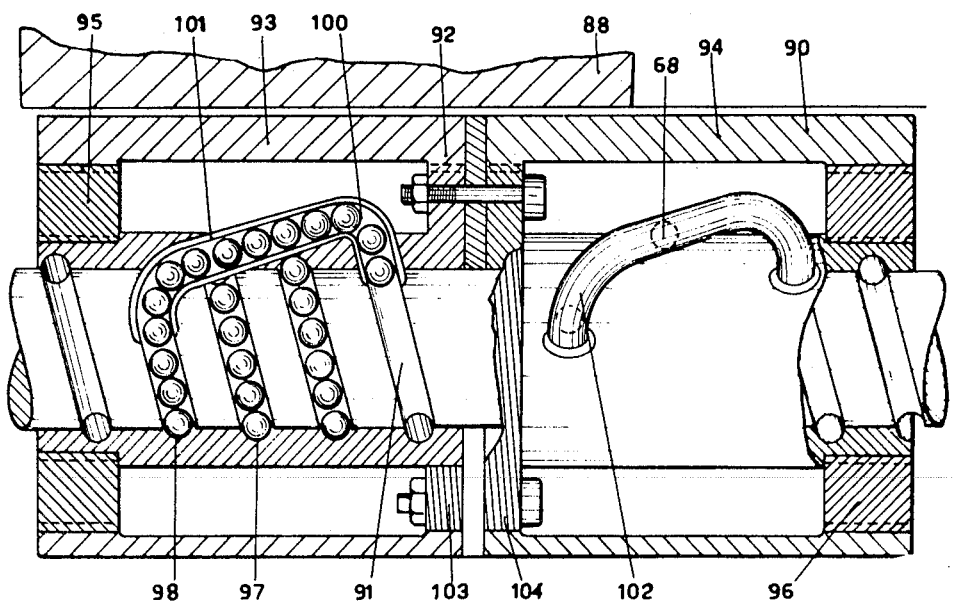
FIG. 6 is an enlarged cutaway view of a preloaded type crossfeed screw with recirculating balls.

To eliminate the play between the crossfeed screw 34 and the nut 90 causing the shifting of cross-slide 88, in order that measurements be obtained with the smallest error, the crossfeed screw 34 is formed in its middle portion with a helical thread groove 91 whose cross section is semicircular, whereon can slide smoothly the nut 90 by means of a recirculating ball bearing 92 (FIG. 6), the ball bearing 92 comprising a left sleeve 93 and a right sleeve 94. The left sleeve 93 has a neck at the outer end, to which is threaded a collar 95, peripherally provided with threads to be screwed in the inner threads of the cross-slide nut 90. The right sleeve 94 similarly comprises a neck at the outer end, to which is fitted a set collar 96 peripherally provided with outer threads screwed in the inner threads of the cross-slide leading nut 90. The left sleeve 93 and the right sleeve 94 are provided internally with a helical thread groove 97 whose cross section is semicircular, and which forms with thread groove 91 a helical channel having a circular cross section. In the channel thus formed balls 98 for the left hub 93, and the balls 99 for the right hub 99 are free to circulate. As seen in FIG. 6 balls 99 are held during the rotation of the crossfeed screw 34 by a guide 100 and enter the left-hand connecting tube 101, which together with the right-hand connecting tube 102 extending helically in a contrary sense, cause then circulation from one portion of the channel and into a forward portion of said channel.

At the inner end the left and right sleeves 93, 94 are fastened together by flanges 103, 104 which are threaded in the periphery to be screwed in the threads cut in the middle portion of the tubular part of the cross-slide nut 90. The space formed between the flanges 103, 104 may be filled up with sealing rings 90a of felt or suitable material to allow a true adjustment between the respective sleeves 93, 94 by means of bolts and nuts 90b.

The crossfeed screw 34 must work with absolute axial precision, not allowing the least cam action, so as not to interfere by adding or subtracting movement on the cross-slide means for each and every full revolution of the cross screw 34. To accomplish this precision, a set of adjusting nuts is applied to an assembly of self-centering ball bearings 107 and 108. At the smooth middle portion 105 (FIG. 7, 8) of the slender part in the end portion of crossfeed screw 34, a carrier ring 106 is fitted with the minimum of bore tolerance. The carrier ring 106 serves as a central support for the left ball bearing 107 and the right ball bearing 108. An outer flat face 109 of a left centering ring 110 placed at the outer left hand of the bearing 107, fits into a recess 111, cut near the upper portion of rear wall of the slide rest 82.

The left centering ring 110 is provided with a concave inner face 112, and the cap of the left ball bearing 107 has a convex face 113 having the same radius of curvature in order to allow the sliding of those surfaces of each other when centering is effected.

Equally the right ball bearing 108 is centered by means of the right centering ring 114 comprising an outer flat face 115 and a concave inner face 116 with the same radius of curvature as that of a convex face 117 of the cap of the right ball bearing 108.

Figure 8:
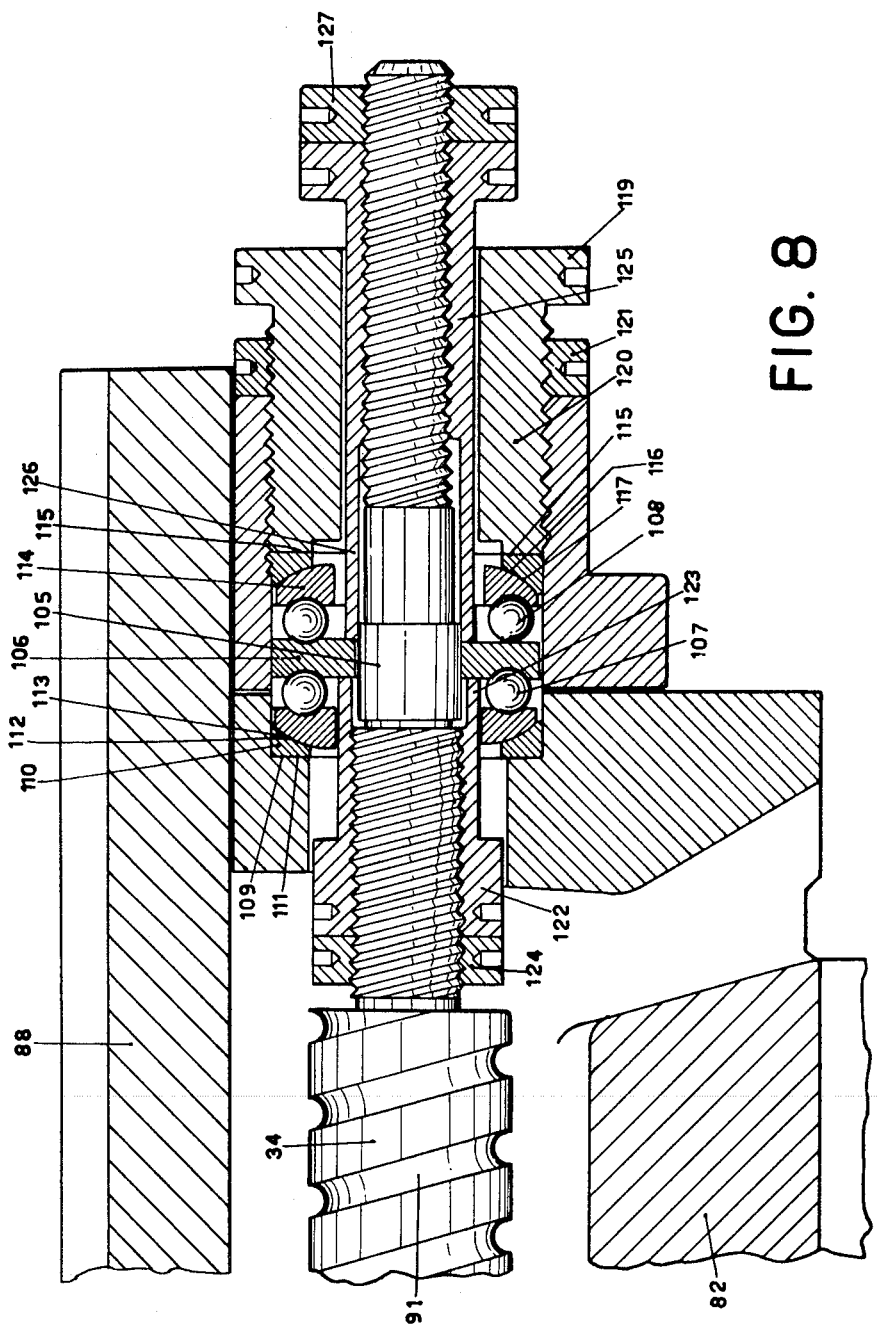
FIG. 8 is an enlarged cutaway view of an axial thrust preventing means for making the crossfeed screw stable.

This bearing assembly is centered by slipping the mating surfaces through tightening, for instance, a clasp nut 118, FIG. 8 which is screwed by the peripheral threads in threads internally existing in the rear wall of the slide rest 82.

The clasp nut 118 is tightened by driving holes drilled in the periphery of a terminal flange 119, and with its inner end 120 presses against the outer flat face 115 of the right centering ring 114 in order that the concave face 116 of the cap of the right ball bearing 108 will center this side of the assembly and at the same time adjusts the convex face of the ball bearing cap on the concave face 112 of the left center ring 109, which fits tightly the recess 111.

The clasp nut 118 is locked in place by means of a check nut 121 tightened by a tool inserted into holes to screw along outer threads provided in clasp nut 118.

The carrier ring 106 is centered from the left-hand side by means of a clasp nut 122 provided with a medium length annular portion 123, which enters the space between the left bearing 107 and the smooth portion 105 of the end of the crossfeed screw 34, and presses against the carrier ring 106. The clasp nut 122 is tightened by means of holes drilled in the periphery of its terminal flange and is locked in place by screwing of a locknut 124. From the right-hand side, the carrier ring 106 is centered by means of a clasp nut 125, whose long tubular end portion 126 projects into the space between the right ball bearing 108 and the smooth portion 105 of the crossfeed screw 34 and presses against the carrier ring 106. The clasp nut 125 is tightened by means of holes drilled in the periphery of its terminal flange and is locked by means of a check nut 127, tightened through the driving holes.

In the preceding paragraphs were described and numbered the constructive parts of the apparatus of this invention; a description of the operation will be now given. The parts of a lathe which strictly do not concern the indicating counter but are closely related thereto, either because they are related to the devices needed for the zero-setting of the lathe or because they are conventional parts mentioned for clarity, will receive additional numerals as this specification continues and reference to parts not previously mentioned is made.

The precision mounting of crossfeed screw 34 by means of the parts above-described being effected, a device capable of determining the geometric axis of the main spindle of a lathe must be provided in order that the cutting tools may have a zero reference from which the turning diameter is measured, that is, the distance between the tool and the geometric axis 89.

FIGS. 9, 10, 11, 12, illustrate a geometric axis determining device 128 by means of which the fixing of the axis or imaginary reference line is obtained. The geometric axis determining device 128 comprises a base 129 formed as a truncated cone, from the major end of which extends a stem 130, the remote end of which forms a half disc 131. The flat faces 132 of the half disc 131 coincide with a plane which passes through the center axis of the base 129 and through the coinciding axis 89 of the main spindle. In the middle portion between these flat faces 132 a recess 133 is provided, the bottom of which is parallel to the flat faces 132. Radially drilled in the half disc 131 is a hole into which is fitted a pin 134 of a gauge 135 whose reading is made by means of a pointer 136. The geometric axis of said hole is perpendicular to the geometric axis 89 of the lathe main spindle and lies in the same horizontal plane. On one end of the pin 134 projecting slightly above the bottom wall of the recess 133 an adjustable sensing projection 137 is provided.

The plane in which the geometric axis 89 lies is determined by a close fitting of the base 129 of the geometric axis determining device 128 to a conical hole in the main spindle (not shown) of the lathe so that the spindle and the base 129 are coaxial. Close to the flat faces 132 a stop 138 shown in FIG. 10 is disposed, which comprises a trapezoidal body with a knurled extension 139 to allow a safe use when handled, and a base face 140 absolutely flat which abuts the flat abutment faces 132 of the half disc 131. The gauge 135 is zeroed with the sensing projection 137 just touching reference face 140. Then any contact with said sensing projection 137 will be indicated by pointer 136, whose zero-setting now corresponds to the vertical plane through the geometric axis of the lathe.

Then the tool post 141 on slide 88 (FIG. 11, 12, 15 and 16) must be placed in a position such that the distance from said toolpost 141 to the geometric axis 89 of the lathe is rigorously determined which will serve as a reference for the tools fitted in the usual manner to the toolpost 141, so that a cross feeding of the tool to remove material from the workpiece is registered in the digital counter 76.

Figure 15:
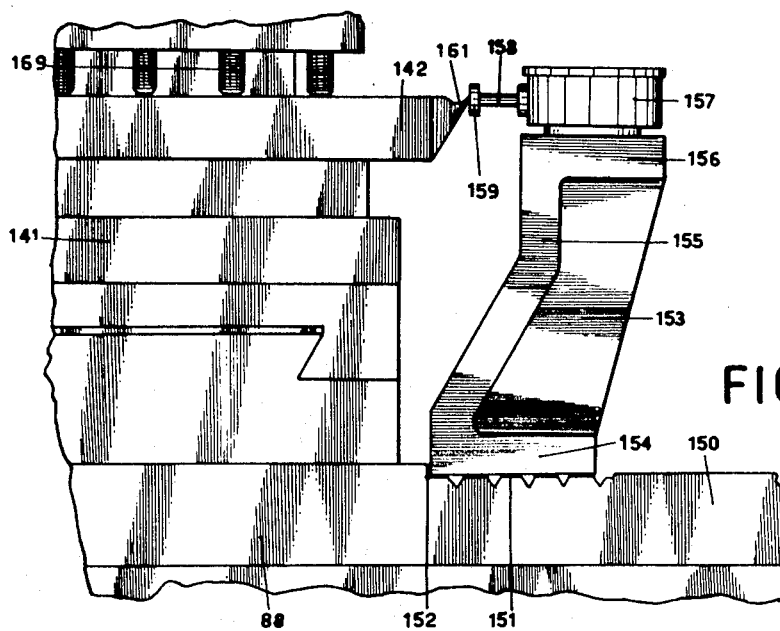
FIG. 15 is a side elevation of the tool zero-setting device.
Figure 16:
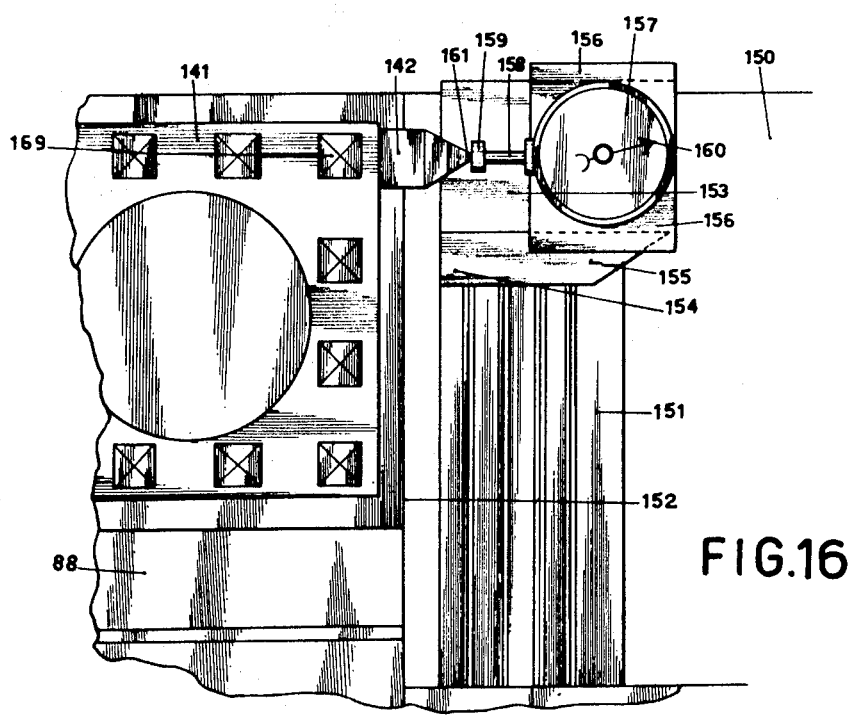
FIG. 16 is a plan view of the tool zero-setting device shown in FIG. 15.

The tool 142 indicated as an example, in FIGS. 15 and 16 must be spaced a certain fixed or measured distance from the zero point selected or from the geometric axis 89 of the lathe main spindle, see FIG. 6. This distance can be determined by means of a setting master bar 143 (FIGS. 11 and 12) which is fixed in the toolpost 141, by means of bolts 169 in the position of a tool. The end 144 of the setting master bar 143 is positioned so that it just touches the sensing projection 137 of the gauge 135, so that pointer 136 registers with the zero point previously determined.

The operator must then set to zero the indicating elements, that is to say, the fractional graduated drum 2 and the digital indicating counter 76, the former for the fractional values and the latter for the whole numbers.

The zero setting of the fractional graduation drum 2 is attained by turning the knurled head 20 of the bolt 19, so that the threads 21 are unscrewed from perforation 22 in lock ring 23, loosening the shoulders 7, 8 of outer ring 4, respectively from the annular flange 10 of central annular support 9 and from the lockring 23. The outer ring 4 is free to be rotated by hand, till the number zero in the graduations 5 registers with an indexing dash 145 (FIG. 3) adequately marked in the periphery of the projecting rim 24 of the support disc 25. Set at zero, the drum 2 is locked again by the driving bolt 19, so that locking ring 4, can only rotate with the rotation of the idle feed control shaft 13.

To zero the digital indicating counter 76, the operator unscrews the knurled knob 68, so that the serrations provided in the inner periphery of the inside flange 69 are disengaged from the serrations provided in the outer periphery of the flange 59, of the outer shaft 51. Since the knurled knob 68 is secured to the disc 67 an outward linear displacement given to the knurled knob 68 is transferred to the disc 67, and the sphere 64 against the spring 65 will get out the recess 63 until reaching the recess 62, in which position the serrations are disengaged from each other. A turning movement of the knurled knob 68 will rotate the shaft 60 by means of the key 146 connecting the shaft 60 to the disc 67, so that the rotary motion, through the pin 72 is transferred to the connecting sleeve 71 and to the end 73 of shaft 74 which is the shaft which actuates the digital counter 76. The characters can thus be set so that zero appears on all the wheels of the counter 76 when viewed through the aperture 80 of housing 1.

The digital counter 76 is locked by pushing the knob 68 toward the housing 1, so that subsequently only through the rotation of the outer shaft 51 will the characters of the digital readout 76 be changed.

After the zero-setting of the indicating devices —digital counter 76 and fractional graduation drum 2—toolpost 141 may be drawn back from the geometric axis 89, in order that this distance be registered in the digital counter 76 and the graduations 5 of outer ring 4, so that the tool may be adjusted for operation.

The rapid forward movements and withdrawals are made through the intermediary of the flywheel 3 and its handle 44. The clockwise rotation of the handle will result in forward movement of the tool 142 and the counterclockwise in the withdrawal thereof relative to the geometric axis 89. The movement is transferred through the gearwheel 38 to the gearwheel 32 and thus to the crossfeed screw 34 in a reverse sense. If the rotation of flywheel 3 is clockwise, that of the crossfeed screw 34 will be counterclockwise. The crossfeed screw rotation motion is transferred to cross-slide nut 90 by rolling the spheres 98, 99 into the channels provided in the inner hollow of the cross-slide leading nut 90 and in the crossfeed screw 34, so that the cross-slide nut 90 is displaced lengthwise carrying the cross-slide 88 and the toolpost 141 in a feeding movement.

Adjustment to the graduation drum 2 is made through the outer ring 4 locked against the central annular support 9, which is engaged in the central bore 11 at the tapered end 12 of the idle feed control shaft 13 and locked by means of the locknut 14, the axial displacement of which is prevented by a screw 17 driven through the split 16. The rotation of the fractional graduation drum 2, will be transferred to the idle feed control shaft 13 and from the spline gears 29 to the spur gear 30, screw 34, and cross-slide 88. In this example, the speed ratio between spline gears 29 and spur gear 30 is 1:10 and the pitch of the crossfeed screw 34 is 5 mm. so that each complete revolution of the fractional graduation drum 2 about its axis, corresponds to one-tenth of one turn of gearwheel 30, that is to say, an angular movement of 360° or a linear displacement for the cross-slide 88 with toolpost 141 and tool 142 of ½ mm.

Consequently, 10 complete revolutions of drum 2 about its own axis are necessary to cause for the cross-slide 88 a linear displacement of 5 mm., that is a complete revolution of the crossfeed screw 34 about its own axis.

The gearing ratio between the gearwheel 32 and the gearwheel 38 is 2:1. Thus, for instance, as the crossfeed screw has a thread pitch of 5 mm., for each complete revolution of the flywheel 3 a linear feed of 2½ mm., will result for the cross-slide 88, as well as for the toolpost 141.

Since the gearwheel 30 engages the teeth 45 in the intermediate shaft 46 the rotation received from the flywheel 3 will be transferred also to the bevel gear 48 and to the bevel gear 50, causing rotation of the outer shaft 51 and through the clutching of the serrations, rotation of the actuating shaft 60 through the key 146, the connecting sleeve 71 and the shaft 75 of the digital counter 76. This will alter the indicated characters of the respective register wheels, through the dummy wheel 77, at each 10 revolutions received.

Since the ratio between the gearwheel 30 and the teeth 45 is 10:1 each complete revolution of crossfeed screw 34 with the gearwheel 30 effected by the flywheel 3 or by the drum 2, produces 10 revolutions of the intermediate shaft 46, and since the ratio between the crown gears 49, 50 is 1:1, the outer shaft 51 and the actuating shaft 60 will rotate the dummy wheel 77 10 times in order that the first wheel will pass from one number to another.

A workpiece is considered by its diameter for its cutting measurements. It is known that the displacement of the tool towards or the retraction of the tool from the geometric axis 89 is linear and amounts to 5 mm. for one complete revolution of the gearwheel 30 and the crossfeed screw 34 about their common axis. Thus, departing from the zero indexed in coincidence with the geometric axis 89 already determined the digital counter will register the numeral 10, in consequence of that one rotation that has drawn back the bit of the cutting tool 5 mm. in linear displacement. Considering the gearing ratio stated above, the drum 2 and the outer ring 4 starting from the zero indexed, will rotate 20 times about their common axis, the numeral zero of graduations 5 indexing again the indexing mark 145 engraved in the projecting rim 24.

The graduations 5 are made with the basic graduations 147 in the circumference of outer ring 4, which amount to 200, each one corresponding to the 0.005 mm. on the workpiece diameter, to 2½ microns (0.0025) of linear displacement of the toolpost 141. Therefore, considering rotation from one basis graduation 147 to the following, the tool 142 will feed a distance equal to a 2.5 thousandth part of 1 mm., since the crossfeed screw 34 has a thread pitch of 5 mm. and has received an angular movement which corresponds to the five-thousandths part of 1 mm. as a result from the ratio of the engagement of gearwheels 29, 30 is 1:10. Every second basis graduation 147 is indicated by a longer dash 148, and corresponds to 0.01 of 1 mm. in the diameter of a workpiece; further, the larger graduations indicated by the long dash 149, in groups of 20 basic divisions, will correspond to 0.1. of 1 mm. in the workpiece diameter; one complete revolution of the drum 2 around its axis will correspond to 1 mm. in the diameter of workpiece, or ½ mm. of linear displacement of toolpost.

After the determination of the zero-setting of the indicating devices—the drum 2 and the digital counter 76—attention is given to the toolpost 141 and the tool 142 needed for the cutting operation. The zero position of the toolpost has already been determined by the setting master bar 143. The toolpost 141 may be drawn back relative to the geometric axis 89 a given distance which is registered both in the graduations 5 on drum 2 and the digital counter 76.

The tool 142 must project from post 141 for the same distance as does the setting master bar 143. To accomplish this, in the upper surface 150 of cross-slide 88 a recess 151 is milled, which is provided with a shoulder 152 perpendicular to the edge of the cross-slide 88. The recess 151 is provided with a series of transverse triangular slots to collect dirt and chips which may fall there.

A tool zero-setting device 153 (FIG. 15 and 16) has its square base 154 abutting the shoulder 52, so that no gaps will arise between the mating surfaces. From the base 154 rises a column 155, which forms a platform 156 in the upper end where a gauge 157 capable of linear displacement is applied. A sensing pin 158 projects from the gauge 157 and ends in a sensing flange 159. The gauge 157 has a pointer 160 which will give indication of the zero-setting as explained hereinafter.

After the base 154 is positively and closely fitted against shoulder 152, the operator feeds tool post 141 through the means already explained, till the digital counter 76 shows again the zeros coincident with the geometric axis 89 of the lathe embodying this invention, and previously altered by the retraction of the toolpost. In this position the end 144 of the setting master bar 143, which is set already as explained hereinbefore, will merely touch the sensing flange 159 and the operator then zeros the pointer 160.

The tool 142 with a bit 161 is adjusted at a certain and given height in relation to a horizontal plane passing through the geometric axis 89, which may be effected by rotating through 90° the geometric axis determining device 128 about main axis 89, in order that the bit 161 of the tool 142 touches the sensing projection 137 of the gauge 135, now incident on a horizontal plane. In order that the height of the tool bit 161 may be determined for future reference, a tool height fixing device 162, see FIGS. 13 and 14, must be employed on the platform 156 of the tool zero-setting device 153, over the gauge 157. This device 162 comprises a plate 163 with downward lateral flaps 164, 165 and a triangular projection 166 in a threaded hole of which is disposed a fine adjusting screw 167 locked by means of a locknut 168, when touching the tool bit.

The zero-setting of the above-mentioned setting master bar 143 will allow that the tool 142 projects a certain distance from the front face of toolpost 141. The distance is called the overhang of the tool. This overhang may be enlarged relative to the initial setting of the geometric axis 89, by the insertion of shims between the vertical faces of the base 154 of the tool zero-setting device 153 and the shoulder 152, on the recess 151. Since the readings on the digital counter 76 and the drum 2 correspond always to the required diameter of the workpiece, the indicating means must be unlocked and set at zero again for a larger overhang of the tool.

When the tool tip 161 lies exactly on the geometric axis 89 of the lathe, the position of the tool may be fixed by means of the bolts 169 to the tool post 141, the toolpost 141 being then drawn back to provide the necessary space for the fitting of the workpiece in the lathe.

Summarizing, member 128 is mounted on the main spindle coaxial with the main axis 89 so that sensor 137 is located in the same when stop face 132 abuts abutment faces 131. Gauge 135 is now manually set to zero.

Master bar 143 is moved with slide 88 on toolpost 141 until its end abuts sensor 137, and gauge 135 has zero indication. Since slide 88 is now in "zero" position counter means 2, 76 are manually set to zero indication.

The position of the master bar 143 in relation to slide 88, 141 is measured by tool-setting gauge 157 which has a fixed position relative to toolpost 141 of slide 88 due to support 153 abutting shoulder 152. Gauge 157 is preferably set to zero indication.

A tool 142, 161 is substituted for the master bar 143 and adjusted until its tip 161 engages gauge 154 indicating zero, or the same indication as before.

When the tool slide 88 is now withdrawn, counter means 2, 76 indicate the distance of the tip 161 of the tool 142 from the main axis 89 and a workpiece can be accurately cut to a desired diameter by observing the diminishing indications of counter means 2, 76 during advance of the slide 88 with the tool toward and into the workpiece. The distance which the tool is withdrawn is registered in subdivisions of millimeters in drum 2, and in millimeters in the digital counter 76 in correspondence with the counterclockwise manual rotation of flywheel 3, which draws the cross-slide 88 away from the geometric axis 89 of the lathe main spindle in the established ratio, that is to say, to each complete turn of flywheel 3 about its axis, crossfeed screw 34 is given an angular displacement of 180° and cross-slide 88 travels a linear distance of 2½ mm.

This displacement is registered as double this amount, to correspond to increase in the diameter of 5 mm., due to the fact that the gearing for the digital counter 76 is arranged so that during the return of the tool 142 the indicated amount is increased above the original zeros set, and by the feed of the tool the indicated amount is diminished in the registered total.

Thus, to each distance of 1 mm. run by the cross-slide 88 as drawn back, the digital counter 76 will register, increasing from 000 in steps of one digit, the number corresponding to twice this amount, that is the digit two. To make clearer the explanation a practical example is given in the following: the digital counter 76 increases by two units for the first millimeter movement of the cross-slide 88; four for the second millimeter; six for the third, and so on, till the travel of the tool is completed by the linear displacement of the cross-slide 88, as explained. The odd numbers follow the same ratio, that is, the numeral one for the first ½ mm.; the numeral three for 1 mm. and ½; the numeral five for the 2½ mm., etc. To sum up, let it be supposed that at the digital counter 76 appears the numeral 200. This means that the tool 142 has been drawn back from the geometric axis linearly, by an amount of 100 mm., which is registered for the adaptation of the workpiece of this example.

The approach of the tool 142 relative to the geometric axis 89, which was obtained by a clockwise rotation of the flywheel 3, will subtract from the numeral 200 in the digital counter, an amount equal to twice the distance in millimeters of the travel of the tool 142 toward the geometric axis.

As a concrete example, let it be supposed that the workpiece blank has a diameter of 152 mm. This diameter will be registered in the digital counter 76 upon the tool bit 161 touching the periphery of the blank. In order to accomplish this, the cross-slide 88 must travel a distance of 24 mm. from the position in which the digital counter registers 200 mm. As clearly stated, counting is made by the diameter. So the travel of the cross-slide 88 towards the geometric axis 89 by the amount of 24 mm. will subtract 48 units from the numeral 200 registered previously in the digital readout 76.

Let it be supposed further that the workpiece is required to have a final diameter of 110 mm. Having in mind such elements as metal hardness, tool bit, cutting speed and so on the operator calculates the cutting depth of the successive tool passages needed to withdraw a coat of 21 mm. in the radius of the blank, in order that the finished workpiece has a diameter of 110 mm.

Let it be supposed yet that the operator wishes to withdraw from workpiece a further coat of twenty-five thousandths of 1 mm., i.e., 0.025 mm., after the final diameter of 110 mm. is obtained. The operator operates the lathe for the cutting as explained, until the numeral 110 appears in digital counter 76. The zero mark of the graduations 5, on the outer ring 4 will register with the indicating mark 145. By an angular motion of outer ring 4, the operator turns drum 2 till the dash corresponding to five graduations 148 registers with the indicating mark 145, resulting in the tool 142 being moved a further distance of 0.025 mm. and a reduction of 0.025 mm. in the radius of the workpiece.

On the other hand the operator wishes to leave a coat of twenty-five thousandths of 1 mm., when the digital readout 76 almost registers the numeral 110, the operator stops the tool feed at the ninety-fifth graduation 148 before the zero registers as the indicating mark 145 in projecting rim 24, resulting that in the blank diameter a coat of 0.05 of 1 mm. remains prior to the blank being the exact diameter of 110 mm.

The corresponding change of the graduations 5 on fractionary graduation drum 2 and the adaptation of digital readout 76, may adjust the device to read in inches.

It will be understood that each of the elements described above, or two or more together, may also find a useful application in other types of methods of presetting tools differing from the types described above.

While the invention has been illustrated and described as embodied in a method of presetting a tool in a lathe by means of gauges and a masterbar, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. The method of presetting a tool for measured movements comprising the steps of moving a cross tool slide of a lathe transversely to the main axis of the lathe with a master bar until the end of the latter is located in said main axis of the lathe; setting counter means which indicate movements of said slide and master bar to zero indication; mounting a tool-setting gauge on said slide in a position in which a sensing member of said gauge touches said end of said master bar causing an indication of said tool-setting gauge; substituting a tool for said master bar on said slide and adjusting the position of the tool until the same touches said sensing member at the same indication of said tool-setting gauge as said master bar; withdrawing said cross tool slide and tool so that said counter means indicate the distance between the tool and said main axis; removing said tool-setting gauge, and setting up a workpiece for rotation about said main axis; and advancing the cross tool slide and said tool until said workpiece is cut by said tool to a predetermined diameter indicated by said counter means.

2. The method of claim 1 wherein the step of moving the cross tool slide until the master bar is located in said main axis includes placing a gauge in said main axis and setting the gauge to zero indication; and moving said cross tool slide until said end of said master bar touches said gauge at zero indication.

3. The method of claim 2 wherein said step of placing said gauge in said main axis includes setting up a reference stop face in said main axis, and placing a sensor of said gauge in touch with said stop face before setting said gauge to zero indication.

4. The method of claim 3 wherein said reference stop face is located in a vertical plane passing through said main axis, and abuts also an abutment face of said gauge when in touch with said sensor.

5. The method of claim 4 comprising the step of turning said gauge 90° about said main axis so that said abutment face and sensor are located in a horizontal plane passing through said main axis; and positioning said tool until the same touches said sensor and is located in said horizontal plane.

6. The method of claim 5 comprising determining the height of the tool during subsequent operations by a height limiting stop set in accordance with the position of the tool in said main axis obtained by said turned gauge.

7. The method of claim 1 wherein said counter means include a counter for units and a counter for fractions of units so that distances traversed by said tool are indicated in units and fractions.

8. The method of claim 1 including setting said tool-setting gauge to zero indication while touched by said master bar; and adjusting the position of said tool until said tool-setting gauge indicates zero.

* * * * *